Patented Aug. 5, 1930

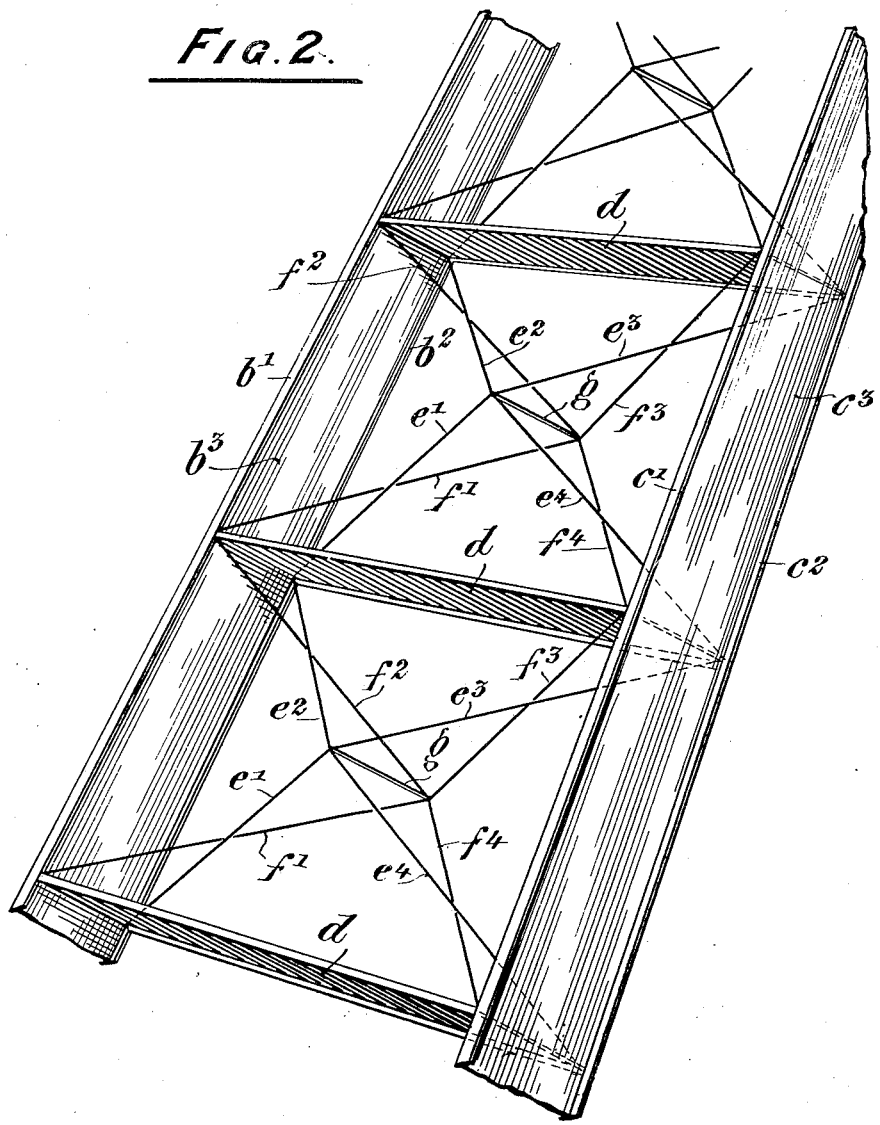

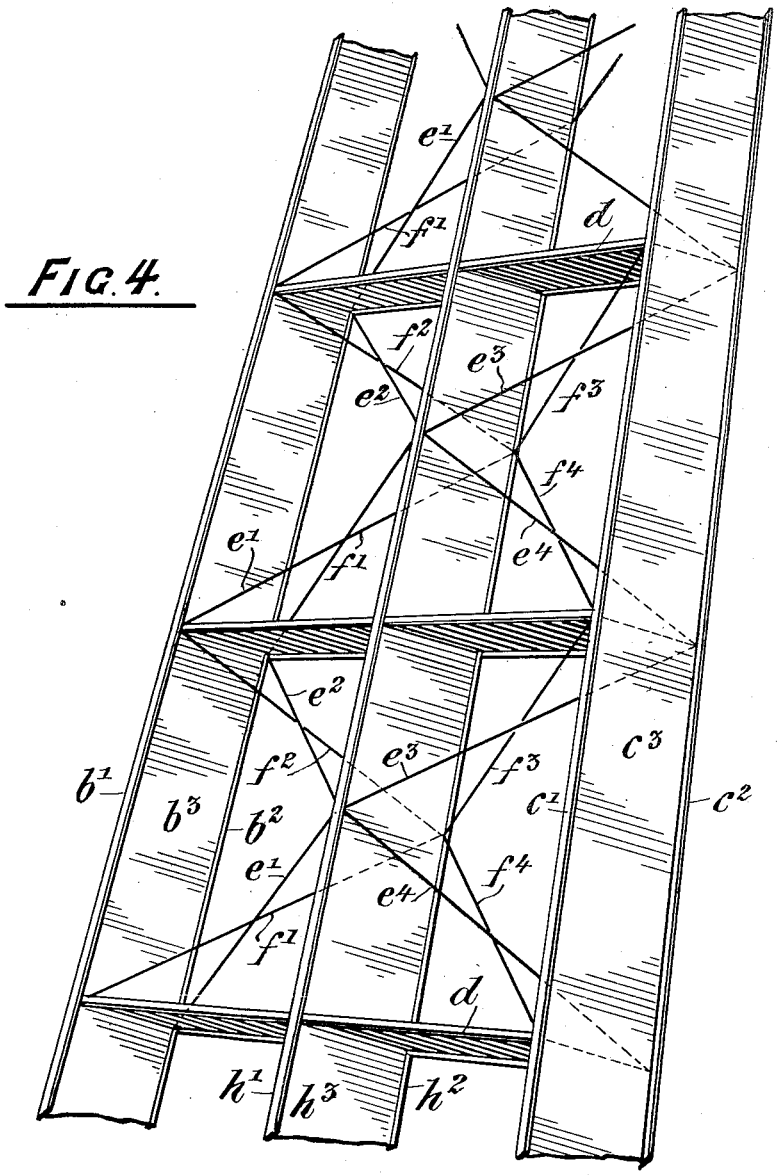

1,772,206

UNITED STATES PATENT OFFICE

ALAN ERNEST LEOFRIC CHORLTON, ROLLO AMYATT DE HAGA HAIG, AND HELMUT JOHN STIEGER, OF LONDON, ENGLAND

MEANS FOR BRACING CANTILEVER WINGS AGAINST TORSIONAL DEFLECTION

Application filed January 13, 1930, Serial No. 420,430, and in Great Britain February 27, 1929.

This invention relates to means for bracing cantilever wings against torsional deflection, and it is particularly applicable to the bracing of wings having fore and aft spars which are stayed and braced together at intervals being thus divided into cellular sections of rectangular or trapezoidal shape from the root of the wing to the outer end of the wing.

The object of the present invention is to provide means for bracing cantilever wings with multiple spars against torsional deflection.

Such cantilever wings comprising spaced spars (each composed of upper and lower narrow booms and a web) stayed and braced together at intervals and thus divided into cellular sections from the root to the outer end, are braced in accordance with the present invention by triangular tension bracing members having their bases on the upper and lower booms, having the apices of the bracing members on the upper booms connected together and the apices of the bracing members on the lower booms connected together to form opposed pyramids, and having the apices of one pyramid stayed apart from the apices of the opposite pyramid.

The apices of the opposed pyramids may be stayed apart by rigid struts, and these struts may be constituted by a spar or spars placed between the spars on which the triangular bracings have their bases.

The accompanying drawings illustrate cantilever wings in accordance with this invention.

Fig. 1 is a sectional view of the wing showing two spars arranged fore and aft in the wing and provided with bracings according to this invention.

Fig. 2 is a perspective view of the spars and bracings.

Figs. 3 and 4 are similar views to Figs. 1 and 2 of a modified form of spar.

Figure 5:
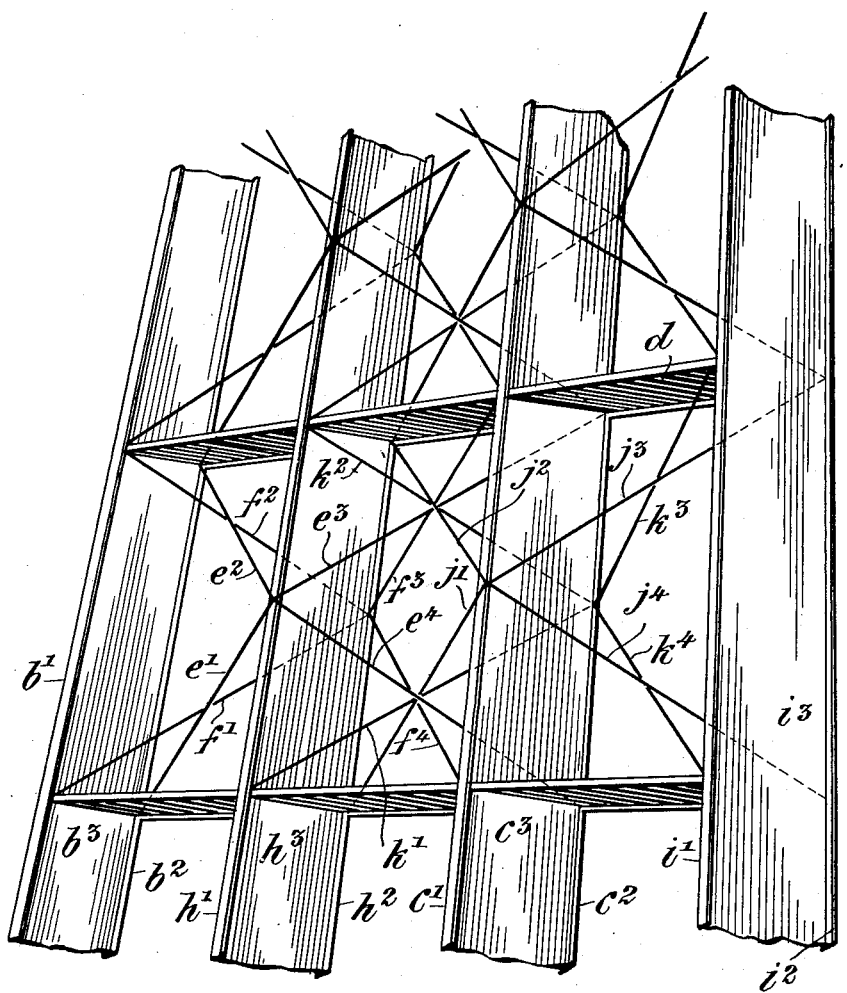
Fig. 5 is a perspective view of a further modification.

In the form illustrated in Figs. 1 and 2 of the accompanying drawings the wing $a$ is provided with fore and aft spars. These spars comprise upper and lower booms $b^1$, $b^2$ in the fore spar and $c^1$, $c^2$ in the aft spar separated by webs $b^3$ and $c^3$, respectively.

The spars are stayed apart by compression ribs $d$ by which the spars are divided into cellular sections from the root of the wing to the outer end, usually termed the 'tip' of the wing. Bracing members are formed by anchoring four tension members $e^1$, $e^2$, $e^3$, $e^4$ to the lower booms of the two spars in each section and connecting such tension bracings together at such a distance from the booms that they form triangles having their bases on the booms extending diagonally across the section and having their apices at the point where they are connected together and arranged with their apices at or near the upper surface of the wing. Similar tension bracings $f^1$, $f^2$, $f^3$, $f^4$ are anchored to the upper booms of both spars in each section and are connected together as before with their apices at or near the lower surface of the wing. These bracing members $e^1$, $e^2$, $e^3$, $e^4$ thus form a pyramid, while the bracing members $f^1$, $f^2$, $f^3$, $f^4$ form a similar but opposite pyramid. The apices of these pyramids are stayed apart by a strut $g$.

Similar opposed pyramid bracing members are arranged in each of the rectangular sections of the spar, the bracing members in the different sections being indicated by like reference numerals in the drawings.

In Figs. 3 and 4 the fore and aft spars, the compression ribs and the tension members are arranged in a similar manner to those in Figs. 1 and 2, and are designated by like reference numerals to corresponding parts in these figures. Instead of a strut $g$ for staying the apices of the opposite pyramids apart, however, an intermediate spar is provided comprising two spaced booms $h^1$, $h^2$ connected by a web $h^3$. This construction is used if for any reason more than two spars are required so that the third spar may then advantageously be placed between the fore and aft spars so that the apices of the pyramids are on the booms of this intermediate spar.

In a similar way more than three spars may be braced together, the tension bracing members forming rows of double pyramids, each constructed and arranged as hereinbefore described. The rows of double pyramids may be juxtaposed side by side, or they may arranged as shown in Fig. 5. In this case we have four spars, the three spars at the left hand side corresponding to the three spars illustrated in Figs. 3 and 4, and corresponding parts are designated by like reference numerals. The additional spar comprises two booms $i^1$, $i^2$ and a web $i^3$. This spar $i^1$, $i^2$, $i^3$ and the intermediate spar $h^1$, $h^2$, $h^3$ constitute the fore and aft spars of a second row of double pyramids comprising tension members $j^1$, $j^2$, $j^3$, $j^4$ forming one pyramid, and $k^1$, $k^2$, $k^3$, $k^4$ forming the other pyramid. The apices of the pyramids in this case are on the booms of the spar $c^1$, $c^2$, $c^3$. Thus we have two rows of double pyramids, one row overlapping the other row.

These wires forming the pyramids combined with the compression ribs, although primarily intended to resist torsional leads in the wing structure, form also the complete drag bracing.

It will be understood that although the webs of the spars have for convenience been shown of composite plate form, they may be made of skeleton form, and this would be desirable from the point of view of minimizing in weight.

What we claim as our invention and desire to secure by Letters Patent is:—

1. Cantilever structures for aircraft comprising a plurality of spars, each provided with two booms spaced apart by a web, means for staying said spars apart, and triangular tension bracing members having their bases on said booms, having their apices connected together in pairs to form opposed pyramids, and having the apices of one pyramid stayed apart from the apices of the opposite pyramid, whereby the structure is braced against torsional deflection.

2. Cantilever structures for aircraft comprising a plurality of spars, each provided with two booms spaced apart by a web, means for staying said spars apart, triangular tension bracing members having their bases on said booms and having the apices of the bracing members on opposite booms of the different spars connected together in pairs to form opposed pyramids, and means for staying the apices of the opposed pyramids apart.

3. Cantilever structures for aircraft comprising a plurality of spars, each provided with two booms spaced apart by a web, means for staying said spars apart, triangular tension bracing members having their bases on said booms and having the apices of the bracing members on opposite booms of the different spars connected together in pairs to form opposed pyramids, and rigid struts for staying the apices of the pyramids apart.

4. Cantilever structures for aircraft comprising at least three spars, means for staying said spars apart, and triangular tension bracing members having their bases on the booms of alternate spars and having the apices connected together on the opposite boom of the intermediate spar so as to form opposed pyramids with the apices of the pyramids stayed apart by said intermediate spar.

5. Cantilever structures for aircraft comprising at least four spars each provided with two booms spaced apart by a web, means for staying said spars apart, and triangular tension bracing members having their bases on the booms of alternate spars and having the apices connected together on opposite boom of an intermediate spar so as to form opposed pyramids with the apices of the opposed pyramids stayed apart by the intermediate spar; the bracing members of one set of spars overlapping the bracing members of other spars.

6. Cantilever structures for aircraft comprising a plurality of spars, each provided with two booms spaced apart by a web, means for staying said spars apart and forming with said spars a plurality of cellular sections, and triangular tension bracing members having their bases on the booms of each section, having their apices connected together in pairs to form opposed pyramids in each section whose bases are on opposite sides of the section and having the apices of one pyramid stayed apart from the apices of the opposed pyramid in each section, whereby the structure is braced against torsional deflection.

7. Cantilever structures for aircraft comprising a plurality of spars, each provided with two booms spaced apart by a web, means for staying said spars apart and forming with said spars a plurality of cellular sections, triangular tension bracing members having their bases on the booms of each section, extending diagonally across the section and having their apices located in the middle of the opposite side of the section to that on which its base is located, the adjacent apices of the triangles being connected together in pairs to form opposed pyramids, and stays located parallel to webs of the spars for holding the apices of the opposed pyramids apart.

In witness whereof we have hereunto set our hands.

ALAN ERNEST LEOFRIC CHORLTON.
ROLLO AMYATT de HAGA HAIG.
HELMUT JOHN STIEGER.